(12) United States Patent
Hasegawa et al.

(10) Patent No.: US 12,436,651 B2
(45) Date of Patent: Oct. 7, 2025

(54) TOUCH SENSOR AND METHOD FOR PRODUCING TOUCH SENSOR

(71) Applicant: FUJIFILM Corporation, Tokyo (JP)

(72) Inventors: Kazuhiro Hasegawa, Kanagawa (JP); Takahiro Ohno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/591,829

(22) Filed: Feb. 29, 2024

(65) Prior Publication Data
US 2024/0310965 A1   Sep. 19, 2024

(30) Foreign Application Priority Data

Mar. 13, 2023  (JP) ................................. 2023-038291
Jul. 10, 2023   (JP) ................................. 2023-112975

(51) Int. Cl.
G06F 3/044   (2006.01)
G06F 3/041   (2006.01)

(52) U.S. Cl.
CPC ........ *G06F 3/0445* (2019.05); *G06F 3/04164* (2019.05); *G06F 3/0448* (2019.05); *G06F 2203/04112* (2013.01)

(58) Field of Classification Search
CPC ......... G06F 3/04164; G06F 3/041–047; G06F 2203/041–04114; G06F 2203/04112;

(Continued)

(56) References Cited

U.S. PATENT DOCUMENTS 9,204,536 B2   12/2015   Yoshiki
2015/0075846 A1   3/2015   Yoshiki
(Continued)

FOREIGN PATENT DOCUMENTS

CN   103631456 A  *  3/2014  ......... G01R 27/2605
JP   5876351 B2     3/2016
WO   WO-2014065532 A1  *  5/2014  ............. G06F 3/041

OTHER PUBLICATIONS

WO-2014065532-A1 (Year: 2014).*
CN-103631456-A (Year: 2013).*

*Primary Examiner* — Sanjiv D. Patel
(74) *Attorney, Agent, or Firm* — Edwards Neils LLC; Jean C. Edwards, Esq.

(57) ABSTRACT

Provided are a touch sensor that can suppress shading unevenness of a touch detection electrode, and a method for producing the touch sensor.
The touch sensor is provided with a substrate (1) and a conductive layer (2A) formed on the substrate (1), and the touch sensor has a structure in which the conductive layers (2A) each have a touch detection electrode, a first electrode pad being formed on the touch detection electrode, a peripheral wiring drawn out from the first electrode pad, and a second electrode pad connected to the peripheral wiring, the touch detection electrode, the first electrode pad, the peripheral wiring, and the second electrode pad have a layer (3) to be plated and a metal plating layer (4) covering the layer (3) to be plated, the layer (3) to be plated of at least one of the first electrode pad or the peripheral wiring has a gap (G), and portions of the metal plating layer (4) across the gap (G) are electrically connected to each other by filling the gap (G) with the metal plating layer (4).

11 Claims, 8 Drawing Sheets

(58) Field of Classification Search
CPC ......... G06F 3/0446; G06F 2203/04103; G06F 3/0448; G06F 3/0443; G06F 3/0445; H01L 21/76877; H01T 21/00; H01T 4/02; H01T 4/08; H01T 4/10; H05K 3/423; H05K 1/0298; H05K 2203/175; H05K 3/242; H05K 1/115; H05K 2201/09254
See application file for complete search history.

(56) References Cited

U.S. PATENT DOCUMENTS

2018/0095584 A1* 4/2018 Lee ................... H10K 59/1213
2022/0382416 A1* 12/2022 Gogte ................. G06F 3/0448

* cited by examiner

TOUCH SENSOR AND METHOD FOR PRODUCING TOUCH SENSOR

CROSS-REFERENCE TO RELATED APPLICATIONS

The present application claims priority under 35 U.S.C. § 119 to Japanese Patent Application No. 2023-038291, filed on Mar. 13, 2023 and Japanese Patent Application No. 2023-112975, filed on Jul. 10, 2023. Each of the above application(s) is hereby expressly incorporated by reference, in its entirety, into the present application.

BACKGROUND OF THE INVENTION

1. Field of the Invention

The present invention relates to a touch sensor that detects a touch operation and a method for producing a touch sensor.

2. Description of the Related Art

In the related art, in various electronic apparatuses including portable information apparatuses such as a tablet-type computer and a smartphone, a touch sensor that detects a so-called touch operation of allowing a finger, a stylus pen, or the like to contact or approach a screen has been used.

Such a touch sensor has a mesh-like touch detection electrode formed of a plurality of fine metal wires, a peripheral wiring drawn out from the touch detection electrode, and an electrode pad connected to the peripheral wiring in many cases, for example, as disclosed in JP5876351B. In JP5876351B, the touch detection electrode, the peripheral wiring, and the electrode pad are formed using a so-called plating method.

SUMMARY OF THE INVENTION

As disclosed in JP5876351B, in a case where a touch detection electrode, a peripheral wiring, and an electrode pad are formed using a plating method, for example, a layer to be plated having a pattern corresponding to the touch detection electrode, the peripheral wiring, and the electrode pad is formed on a substrate, and then the substrate is immersed in a plating liquid, whereby the plating treatments on the touch detection electrode, the peripheral wiring, and the electrode pad are performed at one time. In this case, the thickness of a metal plating layer formed by the plating may be non-uniform, depending on these pattern shapes. Therefore, in a case where an observer visually recognizes a mesh-like touch detection electrode, shading unevenness may occur.

The present invention has been made in order to solve the problems as described above, and has an object to provide a touch sensor that can suppress shading unevenness of a touch detection electrode, and a method for producing the touch sensor.

According to the following configuration, the object can be accomplished.

[1] A touch sensor comprising:
a substrate; and
conductive layers formed on the substrate,
in which the conductive layer has
a touch detection electrode,
a first electrode pad formed on at least one end of the touch detection electrode,
a peripheral wiring drawn out from the first electrode pad, and
a second electrode pad connected to the peripheral wiring,
the touch detection electrode, the first electrode pad, the peripheral wiring, and the second electrode pad each have a layer to be plated and a metal plating layer covering the layer to be plated,
the layer to be plated in at least one of the first electrode pad or the peripheral wiring has a gap that interrupts the layer to be plated, and
portions of the metal plating layer across the gap are electrically connected to each other by filling the gap with the metal plating layer.

[2] The touch sensor as described in [1],
in which the conductive layer has a plurality of conductive pattern parts, each including the touch detection electrode, the first electrode pad, the peripheral wiring, and the second electrode pad, and
the layer to be plated in at least one of the plurality of conductive pattern parts has the gap.

[3] The touch sensor as described in [1] or [2],
in which the touch detection electrode includes a plurality of fine metal wires consisting of the layer to be plated and the metal plating layer, and
a line width of the plurality of fine metal wires is 1.00 μm to 2.00 μm.

[4] The touch sensor according to any one of [1] to [3],
in which the gap of the layer to be plated has a length of 0.50 times to 2.00 times an average thickness of the metal plating layer.

[5] The touch sensor as described in [2],
in which the layer to be plated in the conductive pattern part has a plurality of the gaps.

[6] The touch sensor as described in [5],
in which the layer to be plated includes a discontinuous region composed of a plurality of island-like parts which are spaced from each other, and
the plurality of the gaps are formed between a plurality of portions of the layer to be plated, which are adjacent to each other in a plurality of directions and spaced from each other in the discontinuous region.

[7] A method for producing a touch sensor, the method comprising:
forming, on a substrate, a layer to be plated that has shapes corresponding to a touch detection electrode, a first electrode pad formed on at least one end of the touch detection electrode, a peripheral wiring drawn out from the first electrode pad, and a second electrode pad connected to the peripheral wiring, and has a gap in a portion corresponding to at least one of the first electrode pad or the peripheral wiring, and
forming a metal plating layer on the layer to be plated to fill the gap by a plating treatment.

According to the present invention, it is possible to suppress shading unevenness of a touch detection electrode by a configuration of a touch sensor comprising a substrate and conductive layers formed on the substrate, in which the conductive layers each have a touch detection electrode, a first electrode pad formed on at least one end of the touch detection electrode, a peripheral wiring drawn out from the first electrode pad, and a second electrode pad connected to the peripheral wiring, the touch detection electrode, the first electrode pad, the peripheral wiring, and the second electrode pad each have a layer to be plated and a metal plating layer covering the layer to be plated, the layer to be plated in at least one of the first electrode pad or the peripheral wiring has a gap that interrupts the layer to be plated, and portions of the metal plating layer across the gap are electrically connected to each other by filling the gap with the metal plating layer.

DESCRIPTION OF THE PREFERRED EMBODIMENTS

Hereinafter, a conductive member for a touch panel and a touch panel according to embodiments of the present invention will be described in detail, based on suitable embodiments shown in the accompanying drawings.

Furthermore, in the following, a notation using "to" between numbers indicating a numerical range is intended to include the numerical values described on both sides. For example, an expression that "s is a numerical value t1 to a numerical value t2" means that a range of s is a range including the numerical value t1 and the numerical value t2, and denotes t1≤s≤t2 as expressed in mathematical symbols.

Unless otherwise specified, the meaning of an angle such as a term "perpendicular" or "parallel" includes a case where an error range is generally allowable in the technical field.

A term "transparent" indicates that a light transmittance in a visible wavelength range of 400 to 800 nm is at least 40% or more, preferably 75% or more, more preferably 80% or more, and still more preferably 90% or more. The light transmittance is measured using "Plastics-Determination of Total Luminous Transmittance And Reflectance" defined by JIS K 7375:2008.

Embodiment 1

Figure 1:
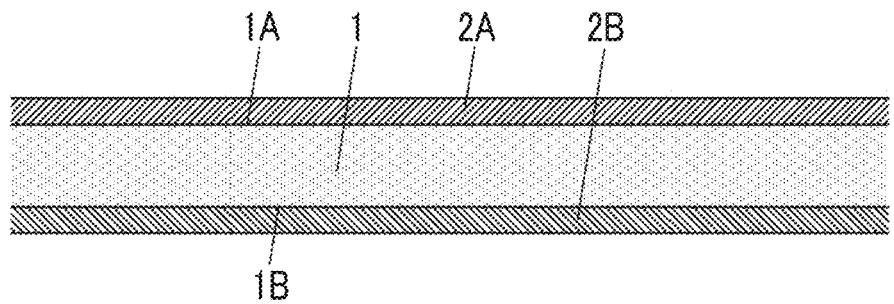
FIG. 1 is a partial cross-sectional view showing a touch sensor according to Embodiment 1.

FIG. 1 shows a configuration of a touch sensor according to Embodiment 1 of the present invention.

The touch sensor comprises a substrate 1 having a first surface 1A and a second surface 1B forming the front and the back from each other, a first conductive layer 2A disposed on the first surface 1A of the substrate 1, and a second conductive layer 2B disposed on the second surface 1B of the substrate 1. The substrate 1 has insulating properties, and the first conductive layer 2A and the second conductive layer 2B are electrically insulated from each other. In addition, the substrate 1 has flexibility, and the touch sensor has flexibility conforming to the flexibility of the substrate 1. In addition, the substrate 1 is composed of a transparent material.

The touch sensor has a cover member not shown that is bonded to a surface on the first conductive layer 2A side, and a display module not shown that is bonded to a surface on the second conductive layer 2B side, and as a result, it can be used as a touch panel display device not shown. In this case, a finger, a stylus pen, or the like of a user that contacts or approaches the cover member is detected, and a touch operation by the user is detected.

Figure 2:
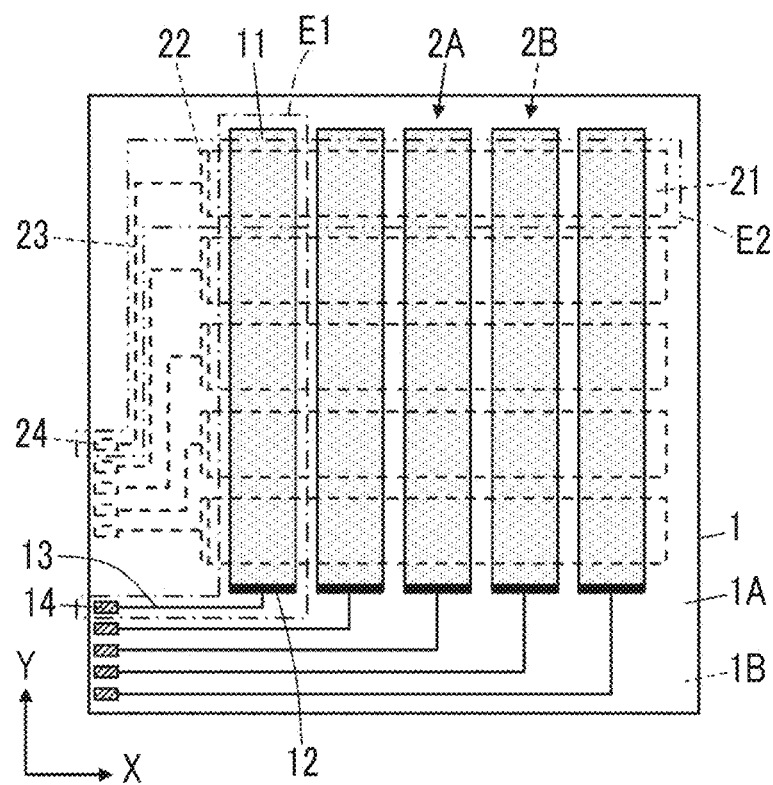
FIG. 2 is a plan view of the touch sensor according to Embodiment 1.

FIG. 2 is a plan view showing the touch sensor.

The first conductive layer 2A has a plurality of touch detection electrodes 11 for detecting a touch operation, which extend along a determined Y direction and are disposed along an X direction perpendicular to the Y direction, a plurality of first electrode pads 12 formed at one end of the plurality of the touch detection electrode 11, a plurality of peripheral wirings 13 drawn out from the plurality of first electrode pads 12, and a plurality of second electrode pads 14 connected to the plurality of peripheral wirings 13. The plurality of second electrode pads 14 are used to be electrically connected to an external device not shown. In addition, a conductive pattern part E1 is composed of the touch detection electrode 11, the first electrode pad 12, the peripheral wiring 13, and the second electrode pad 14, which are electrically connected to each other.

The second conductive layer 2B includes a plurality of touch detection electrodes 21 for detecting a touch operation, which extend along the X direction and are arranged in the Y direction, a plurality of first electrode pads 22 formed at one end of the plurality of touch detection electrodes 21, a plurality of peripheral wirings 23 drawn out from the plurality of first electrode pads 22, and a plurality of second electrode pads 24 connected to the plurality of peripheral wirings 23. The plurality of second electrode pads 24 are used to be electrically connected to an external device not shown. In addition, a conductive pattern part E2 is composed of the touch detection electrode 21, the first electrode pad 22, the peripheral wiring 23, and the second electrode pad 24, which are electrically connected to each other.

A region where the plurality of touch detection electrodes 11 of the first conductive layer 2A are disposed and a region where the plurality of touch detection electrodes 21 of the second conductive layer 2B are disposed overlap each other, with the substrate 1 sandwiched therebetween in a Z direction perpendicular to both of the X direction and the Y direction.

Figure 3:
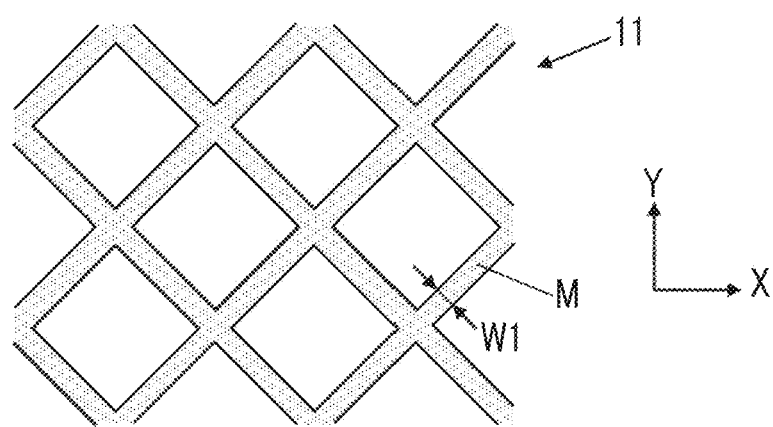
FIG. 3 is an enlarged plan view showing a part of a touch detection electrode according to Embodiment 1.

As shown in FIG. 3, the touch detection electrode 11 in the first conductive layer 2A is composed of a plurality of fine metal wires M forming a mesh shape. In order to suppress the occurrence of a so-called moire in a case where the touch detection electrode 11 disposed on a display module not shown is visually recognized by an observer, an average value of line widths W1 of the plurality of fine metal wires M is preferably in the range of 1.00 μm to 2.00 μm.

Figure 4:
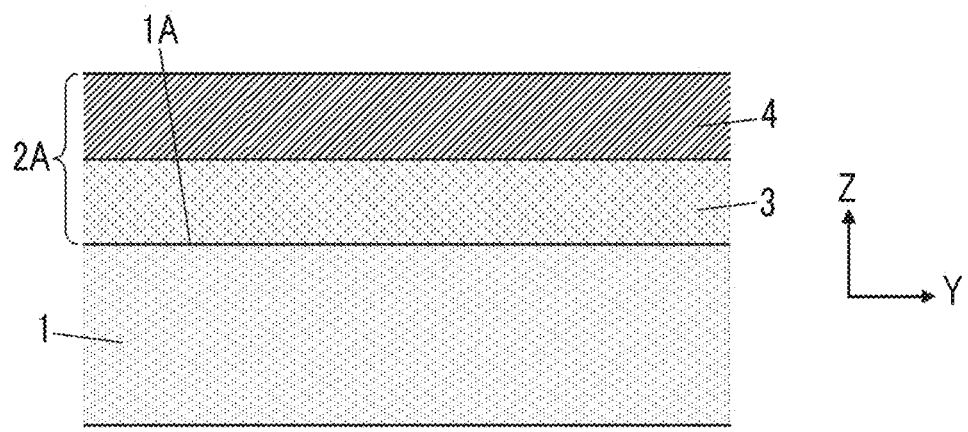
FIG. 4 is an enlarged cross-sectional view showing a part of a first conductive layer according to Embodiment 1.

The first conductive layer 2A is formed by a so-called plating method. As shown in FIG. 4, the first conductive layer 2A has a layer 3 to be plated that is formed on the first surface 1A of the substrate 1, and a metal plating layer 4 that is formed by plating the layer 3 to be plated and covers the layer 3 to be plated.

Figure 5:
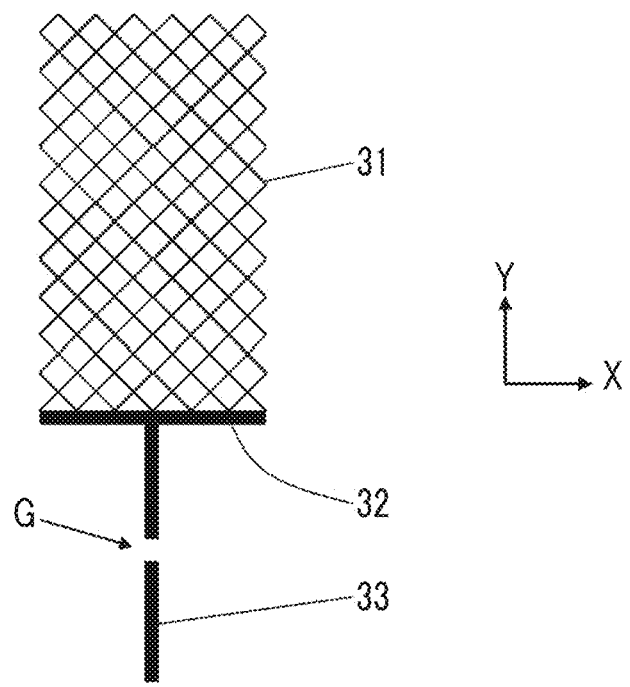
FIG. 5 is an enlarged plan view showing a part of a layer to be plated according to Embodiment 1.

As shown in FIG. 5, the layer 3 to be plated has a touch detection electrode pattern part 31 corresponding to the touch detection electrode 11, a first electrode pad pattern part 32 corresponding to the first electrode pad 12, and a peripheral wiring pattern part 33 corresponding to the peripheral wiring 13. In addition, although not shown, the layer 3 to be plated also has a second electrode pad pattern part corresponding to the second electrode pad 14.

Figure 6:
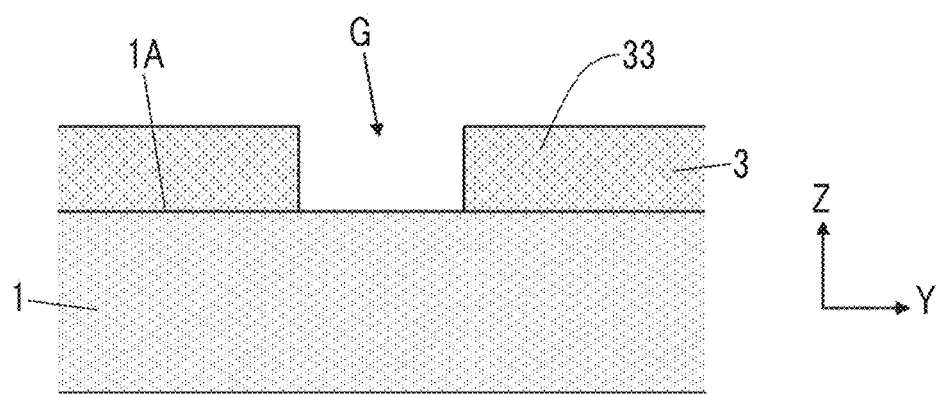
FIG. 6 is an enlarged cross-sectional view showing a part of the layer to be plated according to Embodiment 1.
Figure 7:
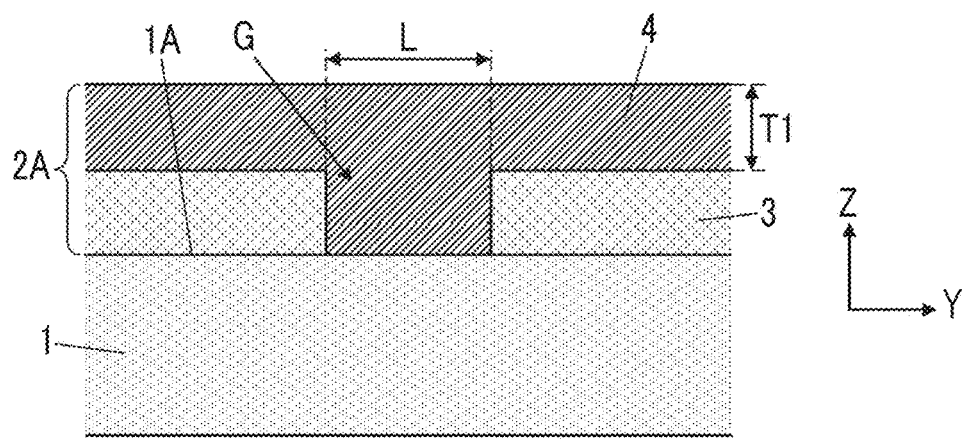
FIG. 7 is an enlarged cross-sectional view showing a portion including a gap in the first conductive layer according to Embodiment 1.

As shown in FIGS. 5 and 6, the peripheral wiring pattern part 33 has a gap G that interrupts the layer 3 to be plated. After the layer 3 to be plated is plated to form the metal plating layer 4, the gap G is filled with the metal plating layer 4 as shown in FIG. 7. Therefore, the portions of the metal plating layer 4 across the gap G are electrically connected to each other.

In a case where the layer 3 to be plated is subjected to a plating treatment, the substrate 1 on which the layer 3 to be plated has been formed is immersed in a plating liquid that includes metal ions to be precipitated and a reducing agent for reducing the metal ions to a metal. In this case, the thickness of the metal plating layer 4 is adjusted depending on the composition of the plating liquid, the plating temperature, the plating time, and the like.

Here, in a case where the layer 3 to be plated does not have the gap G, a plating treatment to be performed on the layer 3 to be plated having a large difference in pattern shape as in the touch detection electrode pattern part 31 and the peripheral wiring pattern part 33 causes a thickness T1 of the metal plating layer 4 in the touch detection electrode 11 to be non-uniform. Thus, in a case where an observer visually recognizes the touch detection electrode 11, shading unevenness may occur.

Figure 8:
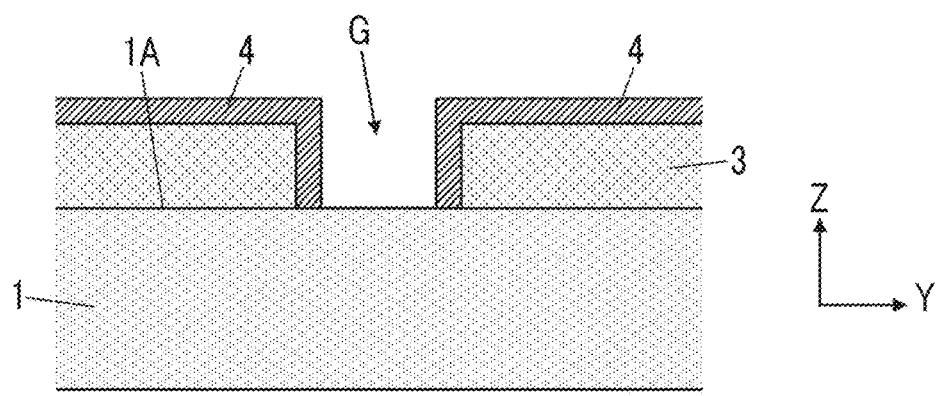
FIG. 8 is an enlarged cross-sectional view showing a part of a metal plating layer during a plating step.

In the touch sensor of Embodiment 1 of the present invention, the peripheral wiring pattern part 33 has the gap G, and therefore, in a case where the layer 3 to be plated is subjected to a plating treatment, for example, as shown in FIG. 8, the gap G is gradually filled with the metal plating layer 4 in a state where the metal plating layer 4 across the gap G are spaced from each other and thus electrically insulated from each other. Then, finally, a state where the gap G is completely filled with the metal plating layer 4 is obtained as shown in FIG. 7. Therefore, the touch detection electrode pattern part 31 and the peripheral wiring pattern part 33 can be independently subjected to a plating treatment until the portions of the metal plating layer 4 across the gap G are electrically connected to each other. The inventors have thus found that the final thickness of the touch detection electrode 11 is uniform by providing a time for independently subjecting the touch detection electrode 11 and the peripheral wiring 13 to a plating treatment in the plating step, and the shading unevenness in a case where an observer visually recognizes the touch detection electrode 11 is suppressed.

The gap G in the layer to be plated preferably has a length L of 0.50 times to 2.00 times an average thickness T of the metal plating layer 4 in order to prevent the thickness of the metal plating layer 4 from being non-uniform. Here, the length L of the gap G can be determined as the shortest distance between the layers 3 to be plated across the gap G in a plan view, that is, in an XY plane. In addition, the average thickness T of the metal plating layer 4 can be calculated as an arithmetic mean of the thickness T1 of the metal plating layer 4 laminated on the layer 3 to be plated at any locations of a determined number of locations such as 10 locations in the touch detection electrode 11. Furthermore, in the following description, a direction along the length L of the gap G is referred to as a length direction of the gap G. In the example of FIG. 5, the length direction of the gap G is equal to the Y direction in which the peripheral wiring pattern part 33 extends.

Furthermore, although not shown, the touch detection electrode 21 in the second conductive layer 2B is also composed of a plurality of fine metal wires M forming a mesh shape as in the touch detection electrode 11 in the first conductive layer 2A. In order to suppress the occurrence of a so-called moire in a case where the touch detection electrode 11 disposed on a display module not shown is visually recognized by an observer, an average value of the line widths W1 of the plurality of fine metal wires M in the second conductive layer 2B is also preferably in the range of 1.00 μm to 2.00 μm.

Moreover, the second conductive layer 2B is also formed by a plating method as in the first conductive layer 2A, and has a layer to be plated and a metal plating layer. In addition, the layer to be plated and the metal plating layer in the second conductive layer 2B each have the same configurations as the layer 3 to be plated and the metal plating layer 4 in the first conductive layer 2A. Therefore, detailed descriptions thereof will not be repeated.

As described above, in the touch sensor according to Embodiment 1 of the present invention, since the layer 3 to be plated of the peripheral wiring 13, that is, the peripheral wiring pattern part 33 has the gap G that interrupts the layer to be plated, the thickness of the touch detection electrode 11 is made uniform and the shading unevenness in a case where an observer visually recognizes the touch detection electrode 11 can be suppressed.

Furthermore, it is described that the first electrode pad 12 is formed at one end of the touch detection electrode 11 and the peripheral wiring 13 is drawn out from the first electrode pad 12. However, the first electrode pad 12 can also be formed at the other end of the touch detection electrode 11 and the peripheral wiring 13 can be drawn out from the first electrode pad 12.

Moreover, the first electrode pads 12 can be formed at both ends of the touch detection electrode 11, and the peripheral wiring 13 can be drawn out from each of the first electrode pads 12. In this case, the layers 3 to be plated in the both of the peripheral wiring 13 drawn out from the first electrode pad 12 formed at one end of the touch detection electrode 11 and the peripheral wiring 13 drawn out from the first electrode pad 12 formed at the other end of the touch detection electrode 11 have the gap G.

In addition, in all of the plurality of conductive pattern parts E1 of the first conductive layer 2A, it is described that the layer 3 to be plated has the gap G, but in at least one of the plurality of conductive pattern parts E1, the layer 3 to be plated may have the gap G. Accordingly, as compared with a case where the layer 3 to be plated in all of the plurality of conductive pattern parts E1 does not have the gap G, the shading unevenness of the touch detection electrode 11 is suppressed. Furthermore, in the second conductive layer 2B, the layer 3 to be plated in at least one conductive pattern part E2 may have the gap G.

Figure 9:
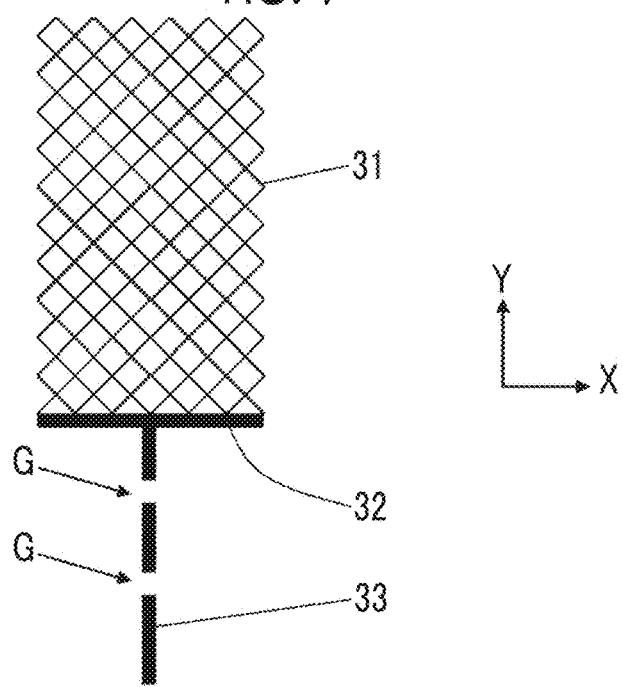
FIG. 9 is an enlarged plan view showing a part of a layer to be plated in a first modification example of Embodiment 1.

In addition, the peripheral wiring pattern part 33 of the layer 3 to be plated can also have a plurality of gaps G. For example, an example in which the peripheral wiring pattern part 33 has two gaps G is shown in FIG. 9.

Figure 10:
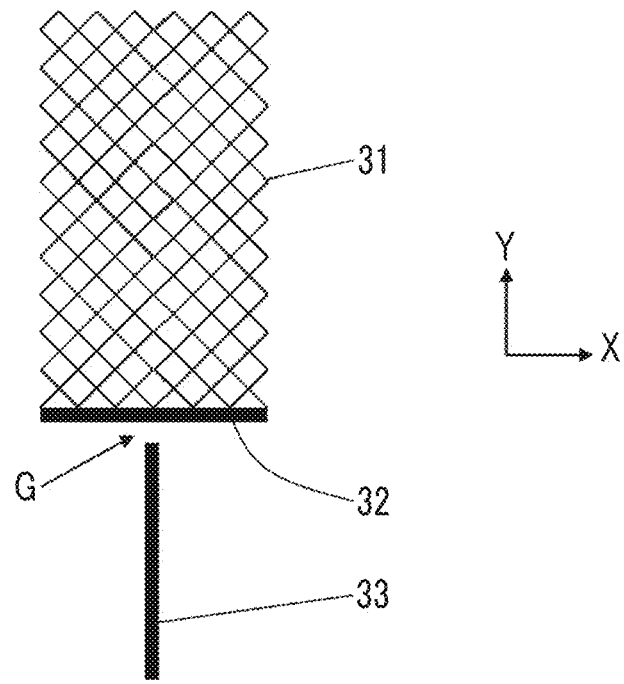
FIG. 10 is an enlarged plan view showing a part of a layer to be plated according to a second modification example of Embodiment 1.

In addition, as shown in FIG. 10, the peripheral wiring pattern part 33 of the layer 3 to be plated may have the gap G at a position corresponding to a connection portion between the peripheral wiring 13 and the first electrode pad 12. Therefore, the peripheral wiring pattern part 33 has the gap G at the position shown in FIG. 10, whereby the touch detection electrode 11 can be formed more uniformly.

Figure 11:
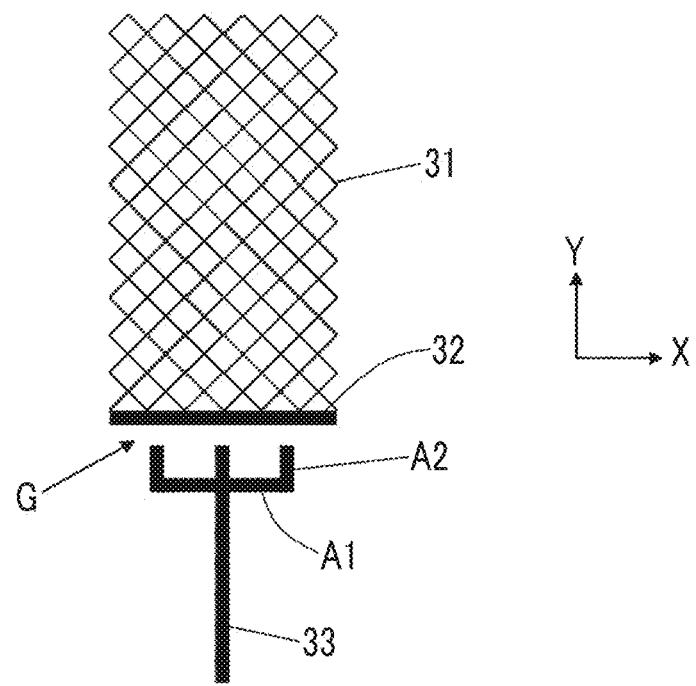
FIG. 11 is an enlarged plan view showing a part of a layer to be plated according to a third modification example of Embodiment 1.

Moreover, as shown in FIG. 11, the peripheral wiring pattern part 33 of the layer 3 to be plated may have an arm part A1 extending along the X direction and three extension parts A2 extending along the Y direction from the arm part A1 toward the first electrode pad pattern part 32 in an end part on the first electrode pad pattern part 32 side. Each of the three extension parts A2 has the gap G that interrupts the layer 3 to be plated. Although not shown, in a case where the metal plating layer 4 is formed by plating, the three gaps G can be filled with the metal plating layer 4 to form three electrical connection points between the first electrode pad 12 and the peripheral wiring 13. Thus, since a plurality of electrical connection points between the first electrode pad 12 and the peripheral wiring 13 are formed, the reliability of electrical connection between the first electrode pad 12 and the peripheral wiring 13 can be improved.

Furthermore, in FIG. 11, although it is shown that the peripheral wiring pattern part 33 has the three extension parts A2, the peripheral wiring pattern part 33 can also have two extension parts A2, or have four or more extension parts A2.

Figure 12:
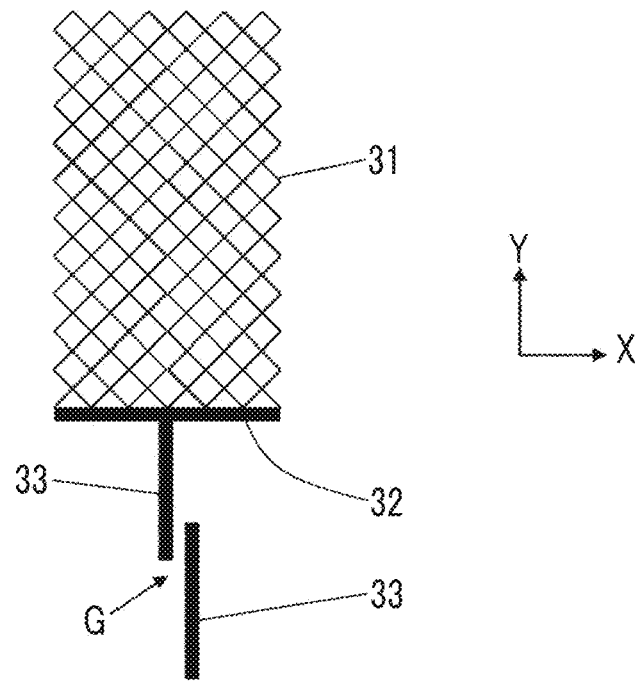
FIG. 12 is an enlarged plan view showing a part of a layer to be plated according to a fourth modification example of Embodiment 1.

In addition, an example in which the length direction of the gap G coincides with the direction in which the peripheral wiring pattern part 33 extends is described, but the length direction of the gap G may not coincide with the direction in which the peripheral wiring pattern part 33 extends. By disposing the peripheral wiring pattern part 33 of the layer 3 to be plated, for example, as shown in FIG. 12 such that the pair of peripheral wiring pattern parts 33 not connected to each other overlap each other in the X direction and are shifted from each other in the Y direction, it is possible to provide a gap G sandwiched between the side surface parts of both the peripheral wiring pattern parts 33 facing each other.

In this case, since the length direction of the gap G is perpendicular to the direction in which the peripheral wiring pattern part 33 extends, the metal plating layer 4 formed at the position of the gap G has a wide width in the width direction perpendicular to the length direction of the gap G, as compared with a case where the length direction of the gap G coincides with the direction in which the peripheral wiring pattern part 33 extends. Therefore, the reliability of the electrical connection between the metal plating layers 4 across the gap G is improved.

In addition, the peripheral wiring pattern part 33 of the layer 3 to be plated can also have a plurality of gaps G in which the length direction of the gap G is a direction intersecting the direction in which the peripheral wiring pattern part 33 extends.

Figure 13:
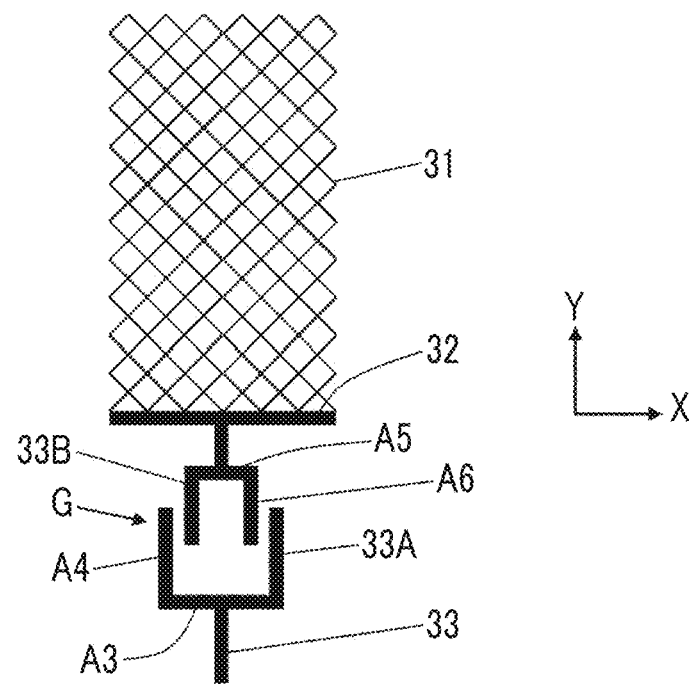
FIG. 13 is an enlarged plan view showing a part of a layer to be plated according to a fifth modification example of Embodiment 1.

For example, as shown in FIG. 13, the peripheral wiring pattern part 33 may have a lower pattern part 33A having a first arm part A3 that extends along the X direction and two first extension parts A4 that extend from the first arm part A3 toward the first electrode pad pattern part 32 along the Y direction; and an upper pattern part 33B located closer on the first electrode pad pattern part 32 side than the lower pattern part 33A, and having a second arm part A5 that extends along the X direction and is shorter than the first arm part A3, and two second extension parts A6 extending from the second arm part A5 toward the lower pattern part 33A along the Y direction. In this case, two gaps G having a length L of the gap G along the X direction are formed by being sandwiched between the first extension part A4 and the second extension part A6, which are adjacent to each other at the shortest distance.

As described above, in a case where the peripheral wiring pattern part 33 of the layer 3 to be plated has a plurality of gaps G such that the length direction of the gap G is a direction intersecting the direction in which the peripheral wiring pattern part 33 extends, a plurality of electrical contacts between the metal plating layer 4 on the lower pattern part 33A and the metal plating layer 4 on the upper pattern part 33B are formed. Therefore, the reliability of the electrical connection point between the metal plating layer 4 on the lower pattern part 33A and the metal plating layer 4 on the upper pattern part 33B is improved.

Figure 14:
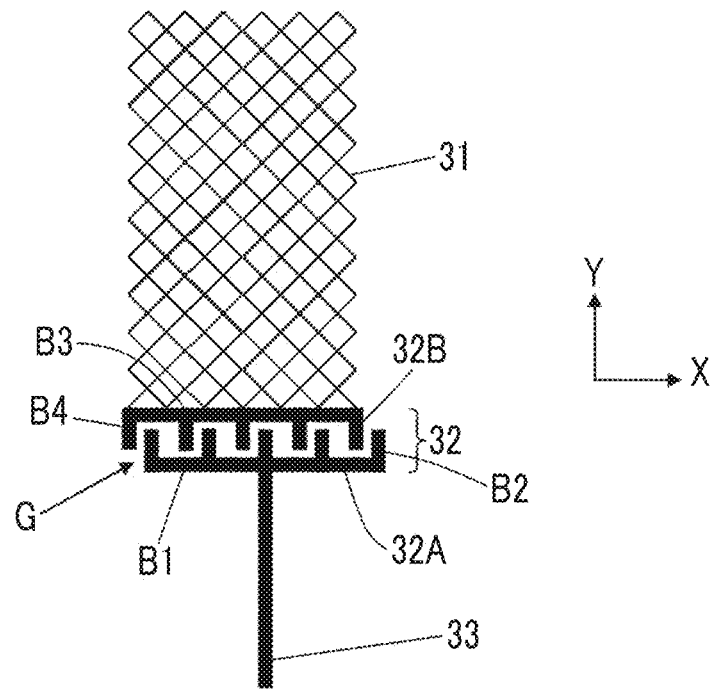
FIG. 14 is an enlarged plan view showing a part of a layer to be plated according to a sixth modification example of Embodiment 1.
Figure 15:
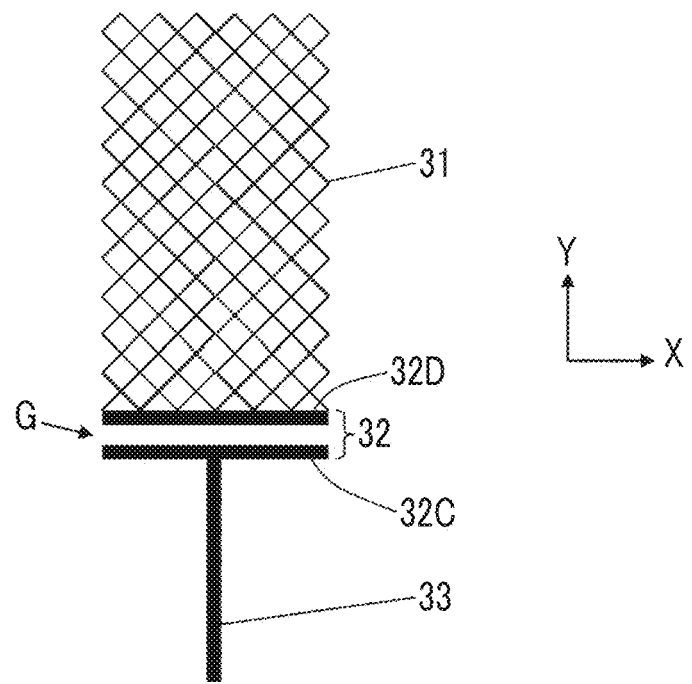
FIG. 15 is an enlarged plan view showing a part of a layer to be plated according to a seventh modification example of Embodiment 1.

In addition, although an example where the peripheral wiring pattern part 33 has the gap G is described, the first electrode pad pattern part 32 may have the gap G, for example, as shown in FIGS. 14 and 15.

In the example of FIG. 14, the first electrode pad pattern part 32 has a lower pattern part 32A having a first arm part B1 that is connected to the peripheral wiring pattern part 33 and extends along the X direction and five first extension parts B2 that extends from the first arm part B1 toward the touch detection electrode pattern part 31 side along the Y direction; and an upper pattern part 32B having a second arm part B3 that is connected to the touch detection electrode pattern part 31 and extends along the X direction and five second extension parts B4 that extends from the second arm part B3 toward peripheral wiring pattern part 33 side along the Y direction. The five first extension parts B2 and the five second extension parts B4 are disposed apart from each other, and five gaps G are formed by being each sandwiched between the first extension part B2 and the second extension part B4, which are adjacent to each other at the shortest distance.

Thus, even in a case where the first electrode pad pattern part 32 has the plurality of gaps G sandwiched between the plurality of first extension parts B2 and the plurality of second extension parts B4, the touch detection electrode 11 can be uniformly formed in the plating step, and the shading unevenness in a case where an observer visually recognizes the touch detection electrode 11 can be suppressed. In addition, due to the presence of the plurality of gaps G, the reliability of the electrical connection between the metal plating layer 4 on the lower pattern part 32A and the metal plating layer 4 on the upper pattern part 32B can be improved.

In the example of FIG. 15, the first electrode pad pattern part 32 has a lower pattern part 32C that is connected to the peripheral wiring pattern part 33 and extends along the X direction; and an upper pattern part 32D that is connected to the touch detection electrode pattern part 31 and extends along the X direction. A gap G is formed by being sandwiched between the lower pattern part 32C and the upper pattern part 32D. Even in this case, in the plating step, the touch detection electrode 11 can be uniformly formed, and the shading unevenness in a case where an observer visually recognizes the touch detection electrode 11 can be suppressed. In addition, a sufficiently long width of the metal plating layer 4 formed at the position of the gap G can be ensured in the X direction which is a width direction of the gap G. Therefore, the reliability of the electrical connection between the metal plating layer 4 on the lower pattern part 32C and the metal plating layer 4 on the upper pattern part 32D can be improved.

Hereinafter, a method for producing the touch sensor of Embodiment 1 will be described.

First, a transparent substrate 1 is prepared, and a layer 3 to be plated is formed on a first surface 1A of the substrate 1, as shown in FIGS. 5 and 6 using, for example, a photolithography method. The layer 3 to be plated has a touch detection electrode pattern part 31 having a shape corresponding to a touch detection electrode 11, a first electrode pad pattern part 32 having a shape corresponding to a first electrode pad 12; a peripheral wiring pattern part 33 having a shape corresponding to a peripheral wiring 13; and a second electrode pad pattern part, not shown, having a shape corresponding to a second electrode pad 14. In addition, the peripheral wiring pattern part 33 has a gap G that interrupts the layer 3 to be plated. Furthermore, although not shown, a layer 3 to be plated having the same configuration as the layer 3 to be plated that is formed on the first surface 1A of the substrate 1 is formed on the second surface 1B of the substrate 1.

Next, in a state where the substrate 1, in which the layers 3 to be plated are each formed on the first surface 1A and the second surface 1B, is immersed in a plating liquid, the layers 3 to be plated are subjected to a plating treatment. As a result, for example, as shown in FIG. 8, the metal is precipitated on the layers 3 to be plated to form the metal plating layers 4. The gap G is gradually filled by gradually increasing the thickness of the metal plating layers 4 in the plating step. As described above, the metal plating layers 4 on the layers 3 to be plated across the gap G are spaced from each other and electrically insulated from each other until the metal plating layers 4 have a constant thickness.

Therefore, the touch detection electrode 11 and the peripheral wiring 13 can be independently subjected to a plating treatment until the plating further progresses to bring the metal plating layers 4 on the layers 3 to be plated, across the gap G, into contact with each other.

Finally, in a case where the gap G is filled with the metal plating layer 4 and the metal plating layers 4 on the layers 3 to be plated across the gap G are electrically connected to each other, for example, as shown in FIG. 7, thereby completing a touch sensor as shown in FIG. 2. Thus, the touch sensor is produced.

Embodiment 2

Figure 16:
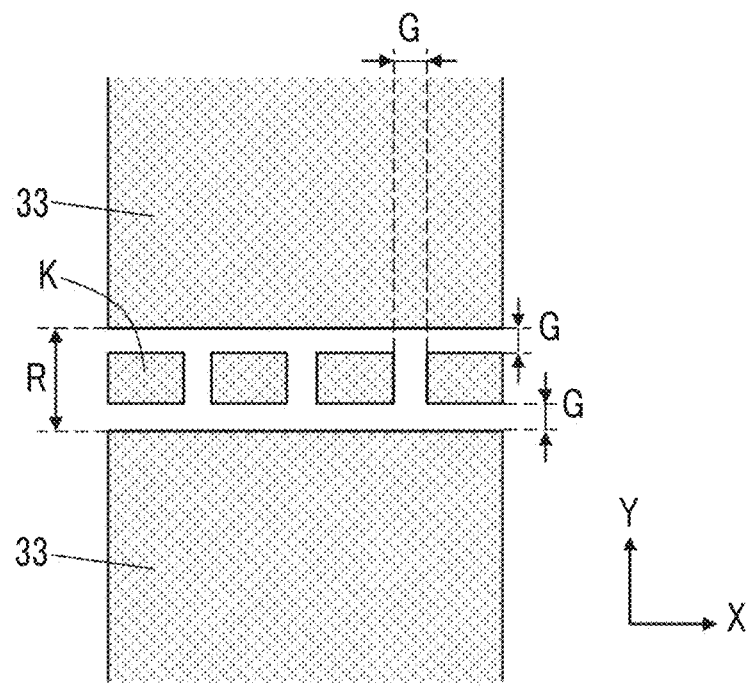
FIG. 16 is an enlarged plan view showing a gap according to Embodiment 2.

An enlarged plan view of a part of the peripheral wiring pattern part 33 of the layer 3 to be plated according to Embodiment 2 is shown in FIG. 16. The layer 3 to be plated includes a discontinuous region R composed of a plurality of island-like parts K spaced from each other with the gap G sandwiched therebetween. The plurality of island-like parts K are not only separated from each other but are also separated with the gap G sandwiched therebetween with respect to the peripheral wiring pattern part 33 in the Y direction. The plurality of island-like parts K are arranged in the discontinuous region R over the entire peripheral wiring pattern part 33 in the X direction. Here, the gap G in Embodiment 2 is determined as a gap that is formed between a plurality of portions that are spaced from each other by the shortest distance in a plurality of directions in the discontinuous region R of the layer 3 to be plated. In the example of FIG. 16, since the island-like part K has a rectangular shape having a side along the X direction and a side along the Y direction, a plurality of gaps G are formed between the island-like parts K adjacent to each other in the X direction, between the island-like parts K adjacent to each other in the Y direction, and between the island-like part K and the peripheral wiring pattern part 33, which are adjacent to each other in the Y direction.

In addition, the plurality of island-like parts K are parts of the layer 3 to be plated, and are formed simultaneously with the touch detection electrode pattern part 31, the first electrode pad pattern part 32, the peripheral wiring pattern part 33, and the second electrode pad pattern part not shown.

Since the layers 3 to be plated are spaced from each other in a plurality of directions by forming the plurality of island-like parts K, a path connecting the metal plating layers 4 with each other can be secured in a plurality of directions in a case where the metal plating layers 4 are formed on the layers 3 to be plated. As a result, in a case where the metal plating layers 4 are formed on the layers 3 to be plated, the portions of the layers 3 to be plated, spaced from each other, are reliably filled with the metal plating layer 4, whereby a yield in production of a touch sensor can be improved.

Furthermore, in an example shown in FIG. 16, four island-like parts K are arranged in the X direction perpendicular to the Y direction, but two or three island-like parts K may be disposed, or five or more of the plurality of island-like parts K may be disposed.

Figure 17:
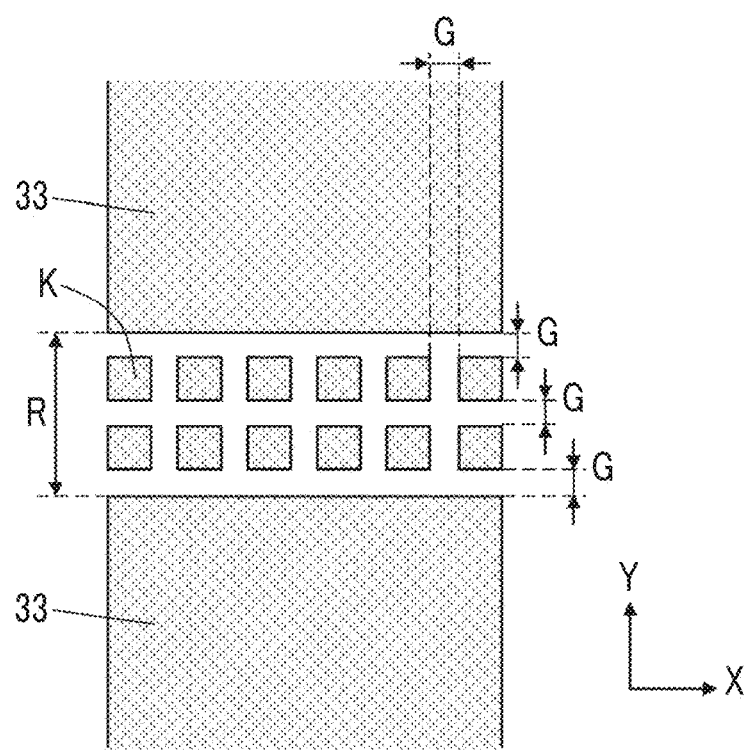
FIG. 17 is an enlarged plan view showing a gap in a first modification example of Embodiment 2.

In addition, the present invention is not limited to a configuration in which a plurality of island-like parts K arranged in a row in the X direction are disposed, and for example, as shown in FIG. 17, a plurality of rows of island-like parts K can also be arranged in the Y direction. In this case, the gaps G are each formed between the island-like parts K adjacent to each other in the X direction, between the island-like parts K adjacent to each other in the Y direction, and between the island-like part K and the peripheral wiring pattern part 33, which are adjacent to each other in the Y direction.

Figure 18:
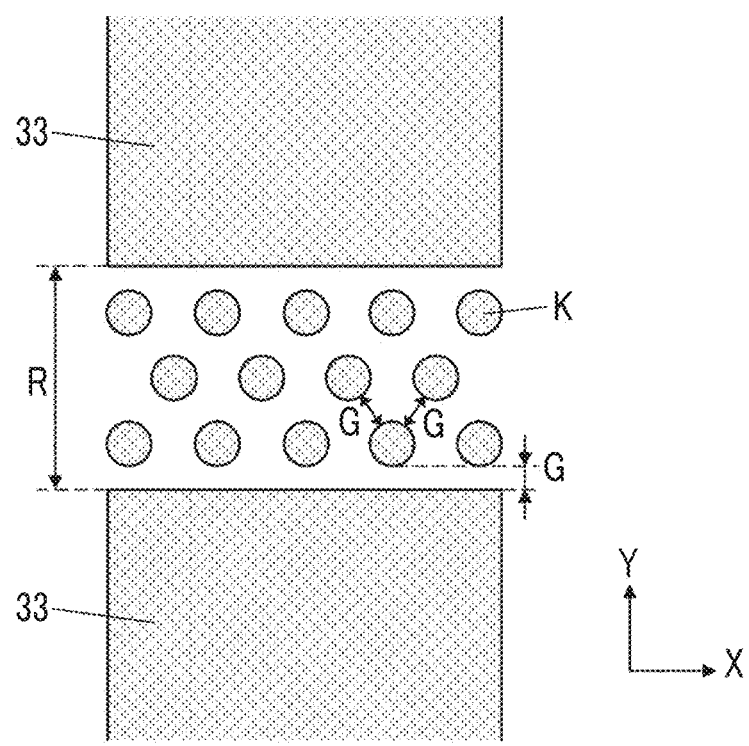
FIG. 18 is an enlarged plan view showing a gap according to a second modification example of Embodiment 2.

In addition, the shape of the island-like part K is not particularly limited, and the island-like part K may have, for example, any shape such as a rectangular shape as shown in FIGS. 16 and 17, a circular shape as shown in FIG. 18, an elliptical shape, a polygonal shape, and an infinite shape. For example, in a case where the circular island-like parts K are arranged in a so-called staggered shape as shown in FIG. 18, the gaps G are each formed between the island-like parts K adjacent to each other at the shortest distance along a direction intersecting the X direction and the Y direction, and between the island-like part K and the peripheral wiring pattern part 33, which are adjacent to each other in the Y direction. In addition, the island-like parts K may be arranged in a staggered manner as shown in FIG. 18 or may be disposed randomly.

Moreover, a plurality of gaps G can be formed by similarly disposing a plurality of island-like parts K in the first electrode pad pattern part 32 or the peripheral wiring pattern part 33, as shown in FIGS. 10 to 15.

In addition, although a case where a part of the peripheral wiring pattern part 33 includes the discontinuous region R composed of the plurality of island-like parts K is described, for example, the entire peripheral wiring pattern part 33 can also be formed of the discontinuous region R. Even in this case, the peripheral wiring pattern part 33 is interrupted. Therefore, the thickness of the touch detection electrode 11 is made uniform as in the case where the peripheral wiring pattern part 33 has the gap G, the shading unevenness in a case where an observer visually recognizes the touch detection electrode 11 can be suppressed, and a yield in production of the touch sensor can be improved.

Furthermore, instead of forming the entire peripheral wiring pattern part 33 with the discontinuous region R, the entire first electrode pad pattern part 32 can be formed of the discontinuous region R, and both the first electrode pad pattern part 32 and the peripheral wiring pattern part 33 can also be formed of the discontinuous region R.

In addition, the lengths of the gaps G formed in the discontinuous region R may be the same as or different from each other, and from the viewpoint of improving the yield in production of the touch sensor, it is preferable that the lengths are the same.

Hereinafter, each of the members constituting the touch sensors according to Embodiments 1 and 2 will be described.

Substrate 1

The kind of the substrate 1 is not particularly limited as long as it is a member that can support the first conductive layer 2A and the second conductive layer 2B. Examples of the substrate 1 include a plastic substrate, a glass substrate, and a metal substrate, among which the plastic substrate is preferable.

As the substrate 1, a substrate having flexibility is preferable from the viewpoint of excellent bendability. Examples of the substrate having flexibility include the plastic substrate.

The thickness of the substrate 1 is not particularly limited and is likely to be 25 µm to 500 µm.

As a material constituting the substrate 1, a resin having a melting point of about 290° C. or lower such as polyethylene terephthalate (PET) (258° C.), polycycloolefin (134° C.), polycarbonate (250° C.), an acrylic film (128° C.), polyethylene naphthalate (269° C.), polyethylene (135° C.), polypropylene (163° C.), polystyrene (230° C.), polyvinyl chloride (180° C.), polyvinylidene chloride (212° C.), or triacetyl cellulose (290° C.) is preferable, and PET, polycycloolefin, or polycarbonate is more preferable. Among these, PET is preferable from the viewpoint of excellent adhesiveness between the first conductive layer 2A and the second conductive layer 2B. The numerical value in the brackets is the melting point or the glass transition temperature.

The total light transmittance of the substrate 1 is preferably 85% to 100%. The total light transmittance is measured using "Plastics—Determination of Total Luminous Transmittance And Reflectance" specified in Japanese Industrial Standards (JIS) K 7375: 2008.

Examples of a suitable aspect of the substrate 1 include a treated substrate that undergoes at least one treatment selected from the group consisting of an atmospheric pressure plasma treatment, a corona discharge treatment, and an ultraviolet irradiation treatment. By performing the above-described treatment, a hydrophilic group such as an OH group is introduced into the treated surface of the substrate 1 such that such that the adhesiveness between the substrate 1 and the first conductive layer 2A and the adhesiveness between the substrate 1 and the second conductive layer 2B are improved. In addition, the atmospheric pressure plasma treatment is preferable among the above-described treatments from the viewpoint of further improving the adhesiveness between the substrate 1 and the first conductive layer 2A and the adhesiveness between the substrate 1 and the second conductive layer 2B.

Undercoat Layer

In order to improve the adhesiveness between the substrate 1 and the first conductive layer 2A and the adhesiveness between the substrate 1 and the second conductive layer 2B, an undercoat layer can also be disposed between the substrate 1 and the first conductive layer 2A and between the substrate 1 and the second conductive layer 2B. This undercoat layer includes a polymer such that the adhesiveness between the substrate 1 and the first conductive layer 2A and the adhesiveness between the substrate 1 and the second conductive layer 2B are further improved.

A method for forming the undercoat layer is not particularly limited, and examples thereof include a method of applying a composition for forming an undercoat layer including a polymer to the substrate and optionally performing a heat treatment thereon. In addition, for example, gelatin, an acrylic resin, a urethane resin, or an acrylic styrene latex including fine particles of an inorganic material or a polymer may be used as a composition for forming the undercoat layer, including a polymer.

Furthermore, the touch sensor may comprise a refractive index adjusting layer, as a layer other than the above-described undercoat layer, between the substrate 1 and the first conductive layer 2A and between the substrate 1 and the second conductive layer 2B. For example, an organic layer to which particles of a metal oxide such as zirconium oxide that adjusts a refractive index has been added can be used as the refractive index adjusting layer, as necessary.

First Conductive Layer and Second Conductive Layer

The first conductive layer 2A and the second conductive layer 2B has a metal or an alloy as a material forming the layer, and can be formed of, for example, silver, copper, gold, aluminum, nickel, chromium, molybdenum, or tungsten. The first conductive layer 2A and the second conductive layer 2B preferably include copper, but may include a metal other than copper, for example, gold or silver. In addition, the first conductive layer 2A and the second conductive layer 2B may have a laminated structure of a metal and a metal compound, and a fine metal wire having a laminated structure such as copper/copper oxide or copper/copper sulfide can be used.

Next, a method for forming the first conductive layer 2A and the second conductive layer 2B will be described. As the method for those layers, a plating method can be used as appropriate.

A method for forming the first conductive layer 2A and the second conductive layer 2B using a plating method will be described. Examples thereof include a method, in which a layer 3 to be plated in which a photosensitive polymer containing plating catalytic metal particles has been patterned by a photolithography method is subjected to a plating treatment, and a method in which a photosensitive polymer having a functional group such as a carboxyl group is patterned by a photolithography method and then a layer 3 to be plated having a catalytic metal supported on a functional group is subjected to a plating treatment by performing a treatment with a solution including catalytic metal ions.

EXAMPLES

Example 1

The present invention will be described in more detail based on the following examples. Materials, used amounts, ratios, treatment details, and treatment procedures shown in the following examples can be appropriately changed within a range not departing from the scope of the present invention. Accordingly, the scope of the present invention is not limited to the following examples.

Preparation of Composition for Forming Layer to be Plated

The following respective components were mixed to obtain a composition for forming a layer to be plated.

Isopropanol 38 parts by mass

Polybutadiene maleic acid (butadiene-maleic acid alternating copolymer, repeating units derived from butadiene:repeating units derived from maleic acid=1:1 (molar ratio), manufactured by Polysciences, Inc.) 4 parts by mass FAM-201 (bifunctional acrylamide, manufactured by FUJIFILM Wako Pure Chemical Corporation) 1 part by mass IRGACURE-OXE02 (Oxime ester-based polymerization initiator, manufactured by BASF) 0.05 parts by mass Manufacture of Substrate with Precursor Layer of Layer to be Plated As a substrate, a polyester film (COSMOSHINE (registered trademark) A4360, manufactured by TOYOBO Co., Ltd.) with easy-adhesive layers on both sides, having a thickness of 50 µm, was prepared. The composition for forming a layer to be plated was applied with a bar on one surface of the substrate such that the thickness was about 0.3 µm. After the application of the composition, the composition was dried at a temperature of 120° C. for 1 minute to obtain a substrate with a precursor layer of a layer to be plated. Then, a protective film made of polypropylene having a thickness of 12 µm was bonded to the surface of the precursor layer of a layer to be plated.

Manufacture of Substrate with Layer to be Plated

An exposure mask having exposure patterns corresponding to a plurality of touch detection electrodes 11, a plurality of first electrode pads 12, a plurality of peripheral wirings 13, and a plurality of second electrode pads 14 was disposed on the substrate with the precursor of the layer to be plated, to which the protective film had been bonded, as shown in FIG. 2.

In the exposure pattern corresponding to the touch detection electrode 11, the line width of the pattern corresponding to the plurality of fine metal wires M was 1.3 µm. In addition, the exposure pattern corresponding to the touch detection electrode 11 had a square mesh-like opening pattern (pitch of 300 µm). Furthermore, the exposure pattern corresponding to the touch detection electrode 11 had a rectangular shape having a width of 2 mm and a length of 100 mm. The exposure pattern corresponding to the first electrode pad 12 had a rectangular shape having a width of 5 µm and a length of 2 mm. The exposure pattern corresponding to the peripheral wiring 13 had a line width of 20 µm and a length of 50 mm. In addition, the exposure pattern corresponding to the second electrode pad 14 had a width of 50 µm and a length of 500 µm. Furthermore, in a case where the exposure pattern corresponding to the conductive pattern part E1 composed of the touch detection electrode 11, the first electrode pad 12, the peripheral wiring 13, and the second electrode pad 14 was disposed such that fifty exposure patterns corresponding to the touch detection electrode 11 were arranged at intervals of 50 µm. In addition, the exposure pattern corresponding to the peripheral wiring 13 had a disconnection part having a length of 0.45 µm corresponding to the gap G at a position separated by 5 mm from the exposure pattern corresponding to the first electrode pad 12.

Next, the substrate with a precursor layer of a layer to be plated was irradiated with UV light at 30 mJ/cm$^2$ using a high-pressure mercury lamp through an exposure mask. After the irradiation with UV light, the protective film was peeled off from the substrate with the precursor layer of a layer to be plated. The substrate with the precursor layer of a layer to be plated, from which the protective film had been peeled off, was shower-washed with a 1% by mass aqueous sodium carbonate solution and subjected to an alkali development treatment to obtain a substrate with a mesh-like layer to be plated. As shown in FIG. 5, the formed layer to be plated had the touch detection electrode pattern part 31, the first electrode pad pattern part 32, the peripheral wiring pattern part 33, and the second electrode pad pattern part not shown.

An average height of the layer to be plated in the touch detection electrode pattern part 31 was 0.28 µm, and an average line width of the layer to be plated in the touch detection electrode pattern part 31 was 1.35 µm. The length L of the gap G in the peripheral wiring pattern part 33 was 0.35 µm.

Here, for each of the average height and the average line width of the layer to be plated, any ten points on the layer to be plated in the touch detection electrode pattern part 31 were selected, optical images of the cross-sections of the layer to be plated, perpendicular to the direction in which the fine line pattern extends were captured at each of the selected points, and the heights and the line widths of the cross-sections of the layer to be plated shown in the captured optical images were measured to obtain the heights and the line widths at the ten points on the layer to be plated. Further, the average value of the heights at the ten points on the layer to be plated and the average value of the line widths at the ten points on the layer to be plated were calculated, and used as the average height and the average line width of the layer to be plated.

Manufacture of Substrate (Touch Sensor) with Copper Plating Layer

A Pd catalyst-imparting liquid Omnishield 1573 activator (manufactured by Rohm and Haas Electronic Materials LLC) was diluted with pure water to 3.6% by volume, and the substrate with the layer to be plated was immersed in an aqueous solution with a pH (hydrogen ion exponent) adjusted to 4 with 0.1 N hydrochloric acid at a temperature of 45° C. for 5 minutes. Thereafter, the substrate with the layer to be plated was washed twice with pure water.

Next, the substrate with the layer to be plated was immersed in a 0.8% by volume aqueous solution of a reducing agent CIRCUPOSIT PB Oxide Converter 60C (manufactured by Rohm and Haas Electronic Materials LLC) at a temperature of 30° C. for 5 minutes. Thereafter, the substrate with the layer to be plated was washed twice with pure water and subjected to a Pd catalyst treatment. Next, the substrate with the layer to be plated which had been subjected to the Pd catalyst treatment was immersed in an electroless plating liquid obtained by mixing 12% by volume of an M agent, 6% by volume of an A agent, and 10% by volume of a B agent of CIRCUPOSIT 4500 (manufactured by Rohm and Haas Electronic Materials LLC) at a temperature of 45° C. for 35 minutes. Thereafter, the substrate with the layer to be plated was washed with pure water to form a copper plating layer covering the layer to be plated as a metal plating layer, thereby obtaining a substrate (touch sensor) with the copper plating layer. The touch sensor thus obtained had the first conductive layer 2A including a plurality of touch detection electrodes 11; a plurality of first electrode pads 12; a plurality of peripheral wirings 13; and a plurality of second electrode pads 14, for example, as shown in FIG. 2.

An average thickness T of the metal plating layer in the fine metal wire M of the touch detection electrode 11 in the obtained touch sensor was 0.80 µm, and an average line width W of the fine metal wire M was 1.50 µm. Here, in a case of calculating the average thickness T of the metal plating layer and the average line width W of the fine metal wire M, first, any ten points in the touch detection electrode 11 were selected, optical images of cross-sections of the fine metal wires M perpendicular to the direction in which the fine metal wires M extend were captured at each of the selected points, and the thicknesses T1 of the metal plating layer on the cross-section of the fine metal wire M and the line widths W1 of the fine metal wire M on the fine metal wire M reflected in the captured optical images were measured to obtain the thicknesses T1 of the metal plating layer on the fine metal wire M and the line widths W1 of the fine metal wire M at ten points on the fine metal wire M. Further, an average value of the thicknesses T1 of the metal plating layer at ten points on the fine metal wire M and an average value of the line widths W1 at ten points on the fine metal wire M were calculated, and used as an average thickness T of the metal plating layer and an average line width W of the fine metal wire M. Here, in the cross-section of the fine metal wire M at each point, a maximum values of each of the thicknesses T1 and the line widths W of the metal plating layer were used for the calculation.

In addition, a ratio of the length L of the gap G in the layer to be plated to the average thickness T of the metal plating layer measured as above was 0.35 µm/0.80 µm=0.44.

Example 2

A touch sensor of Example 2 was produced in the same manner as in Example 1, except that in the step of manufacturing the substrate with the layer to be plated, an exposure mask such that the length L of the gap G in the peripheral wiring pattern part 33 of the layer to be plated was set to 0.40 µm was used. A ratio of the length L of the gap G in the layer to be plated to the average thickness T of the metal plating layer was 0.40 µm/0.80 µm=0.50.

Example 3

A touch sensor of Example 3 was produced in the same manner as in Example 1, except that in the step of manufacturing the substrate with the layer to be plated, an exposure mask such that the length L of the gap G in the peripheral wiring pattern part 33 of the layer to be plated was set to 0.80 µm was used. A ratio of the length L of the gap G in the layer to be plated to the average thickness T of the metal plating layer was 0.80 µm/0.80 µm=1.00.

Example 4

A touch sensor of Example 4 was produced in the same manner as in Example 1, except that in the step of manufacturing the substrate with the layer to be plated, an exposure mask such that the length L of the gap G in the peripheral wiring pattern part 33 of the layer to be plated was set to 1.60 µm was used. A ratio of the length L of the gap G in the layer to be plated to the average thickness T of the metal plating layer was 1.60 µm/0.80 µm=2.00.

Example 5

A touch sensor of Example 5 was produced in the same manner as in Example 1, except that in the step of manufacturing the substrate with the layer to be plated, an exposure mask such that the length L of the gap G in the peripheral wiring pattern part 33 of the layer to be plated was set to 2.00 µm was used. A ratio of the length L of the gap G in the layer to be plated to the average thickness T of the metal plating layer was 2.00 µm/0.80 µm=2.50.

Example 6

A touch sensor of Example 6 was produced in the same manner as in Example 1, except that in the step of manufacturing the substrate with the layer to be plated, an exposure mask having an exposure pattern corresponding to the layer to be plated having the shape shown in FIG. 12 instead of the exposure pattern corresponding to the layer to be plated having the shape shown in FIG. 5, such that the length L of the gap G in the peripheral wiring pattern part 33 of the layer to be plated was set to 1.60 µm, was used.

Example 7

A touch sensor of Example 7 was produced in the same manner as in Example 1, except that in the step of manufacturing the substrate with the layer to be plated, an exposure mask having an exposure pattern corresponding to the layer to be plated having the shape shown in FIG. 11 instead of the exposure pattern corresponding to the layer to be plated having the shape shown in FIG. 5, such that the length L of the gap G in the peripheral wiring pattern part 33 of the layer to be plated was set to 1.60 µm, was used.

Example 8

A touch sensor of Example 8 was produced in the same manner as in Example 3, except that in the step of manufacturing the substrate with the layer to be plated, an exposure mask such that an average line width W of the fine metal wire M in the touch detection electrode pattern part 31 of the layer to be plated was set to 1.80 µm was used.

Example 9

A touch sensor of Example 9 was produced in the same manner as in Example 3, except that in the step of manufacturing the substrate with the layer to be plated, an exposure mask such that an average line width W of the fine metal wire M in the touch detection electrode pattern part 31 of the layer to be plated was set to 2.00 µm was used.

Example 10

A touch sensor of Example 10 was produced in the same manner as in Example 1, except that in the step of manufacturing the substrate with the layer to be plated, an exposure mask having an exposure pattern corresponding to the discontinuous region R composed of a plurality of island-like parts K as shown in FIG. 16 was used. The length of the gaps G formed between the plurality of island-like parts K and between the plurality of island-like parts K, and between the peripheral wiring pattern parts 33 located at both end parts of the discontinuous region R in the Y direction was 0.80 μm.

Example 11

A touch sensor of Example 11 was produced in the same manner as in Example 1, except that in the step of manufacturing the substrate with the layer to be plated, an exposure mask having an exposure pattern corresponding to the discontinuous region R composed of a plurality of island-like parts K as shown in FIG. 17 was used. The length of the gap G in Example 11 was 0.80 μm.

Example 12

A touch sensor of Example 12 was produced in the same manner as in Example 11, except that in the step of manufacturing the substrate with the layer to be plated, an exposure mask such that the length of the gap G was set to 2.00 μm was used.

Comparative Example 1

A touch sensor of Comparative Example 1 was produced in the same manner as in Example 1, except that in the step of manufacturing the substrate with the layer to be plated, an exposure mask in which a disconnection part corresponding to the gap G of the peripheral wiring pattern part 33 of the layer to be plated was not formed was used. In the touch sensor of Comparative Example 1, the layer to be plated did not have the gap G.

With regard to the touch sensors of Examples 1 to 12 and Comparative Example 1 produced as above, evaluations of shading unevenness, a moire, and a yield shown below were performed.

Evaluation of Shading Unevenness

The touch sensor was disposed on Schaukasten (NEO80, manufactured by Muranaka Medical Instruments Co., Ltd.), and shading unevenness of the touch detection electrode was observed in a plan view by visual inspection of five observers from a position at a distance of 30 cm. The shading unevenness was evaluated according to the following standards and the evaluation obtained from the most observers was taken as a final evaluation result. Evaluation A is at an excellent level, Evaluation B is at a level in which there is no problem in practical use, and Evaluation C is at a level in which there is a problem in practical use.

A: No shading unevenness can be observed.
B: Slight shading unevenness can be observed.
C: Shading unevenness can be observed.

Evaluation of Moire

The touch sensor was disposed to be closely attached on a high-definition liquid crystal panel of a 7.9-inch quad extended graphics array (QXGA, width 2,048×length 1,536 dots), and visually observed in a plan view by five observers from a position at a distance of 30 cm from the liquid crystal panel. A moire that had occurred by interference between the touch sensor and a pixel pattern of the liquid crystal panel was evaluated in accordance with the following standards, and the evaluation obtained from the most observers was taken as a final evaluation result.

A: A moire is not observed.
B: A moire is slightly observed.

Evaluation of Yield

In each of the 50 conductive pattern parts E1 in the touch sensor, an electric resistance between the first electrode pad 12 and the second electrode pad 14 was measured with a digital multimeter (TY530, manufactured by Yokogawa Electric Corporation). A location where the value of the electric resistance was 1Ω or more was counted as a conduction failure, and a ratio of the number of the conductive pattern parts E1 in which the conduction failure occurred to all of the 50 conductive pattern parts E1 was calculated as a failure ratio (%). The calculated failure ratio was evaluated based on the following standards.

A: The failure ratio is 0% (there is no conduction failure).
B: The failure ratio is less than 5%.
C: The failure ratio is 5% or more.

The evaluation results for Examples 1 to 7 and Comparative Example 1 are shown in Table 1.

TABLE 1

| | Shape of layer to be plated | Length L of gap G | Average thickness T of metal plating layer | Length L/average thickness T | Average line width W of fine metal wire M | Evaluation of shading unevenness | Evaluation of moire | Evaluation of yield |
|---|---|---|---|---|---|---|---|---|
| Example 1 | FIG. 5 | 0.35 μm | 0.80 μm | 0.44 | 1.50 μm | B | A | A |
| Example 2 | FIG. 5 | 0.40 μm | 0.80 μm | 0.50 | 1.50 μm | A | A | A |
| Example 3 | FIG. 5 | 0.80 μm | 0.80 μm | 1.00 | 1.50 μm | A | A | A |
| Example 4 | FIG. 5 | 1.60 μm | 0.80 μm | 2.00 | 1.50 μm | A | A | B |
| Example 5 | FIG. 5 | 2.00 μm | 0.80 μm | 2.50 | 1.50 μm | A | A | C |
| Example 6 | FIG. 12 | 1.60 μm | 0.80 μm | 2.00 | 1.50 μm | A | A | A |
| Example 7 | FIG. 11 | 1.60 μm | 0.80 μm | 2.00 | 1.50 μm | A | A | A |
| Comparative Example 1 | None | — | 0.80 μm | — | 1.50 μm | C | A | A |

As shown in Table 1, it can be seen that in the touch sensors of Examples 1 to 7, the evaluation results of all of the shading unevenness were A or B, and the shading unevenness was not a problem in practical use. In Examples 1 to 7, since the layer to be plated has the gap G, a time during which the touch detection electrode 11 and the peripheral wiring 13 were independently subjected to a plating treatment was secured, and the thickness of the fine metal wire M in the touch detection electrode 11 was uniform. As described above, in Examples 1 to 7, it is considered that since the thickness of the fine metal wire M was uniform, the shading unevenness which is a problem in practical use could not be observed even in a case where the observer observed the touch detection electrode 11.

On the other hand, in the touch sensor of Comparative Example 1, the shading unevenness was evaluated as C. In the touch sensor of Comparative Example 1, since the layer to be plated did not have the gap G, there was no time during which the touch detection electrode 11 and the peripheral wiring 13 were independently subjected to a plating treatment, and the thickness of the fine metal wire M in the touch detection electrode 11 was non-uniform. Therefore, in Comparative Example 1, it is considered that in a case where an observer observed the touch detection electrode 11, the shading unevenness occurred to such an extent that there was a practical problem.

Furthermore, with regard to the evaluation of the shading unevenness, Examples 2 to 7 were evaluated as A, but Example 1 was evaluated as B. In Example 1, the ratio of the length L of the gap G in the layer to be plated to the average thickness T of the metal plating layer was 0.44, and the gap G was short with respect to the average thickness T of the metal plating layer. Therefore, it is considered that the time taken for the touch detection electrode 11 and the peripheral wiring 13 to be independently subjected to a plating treatment was short, and the shading unevenness occurred slightly.

In addition, with regard to the evaluation of the yield, Examples 1 to 3, 6, and 7 were evaluated as A, but Example 4 was evaluated as B and Example 5 was evaluated as C. In Example 4, the ratio of the length L of the gap G in the layer to be plated to the average thickness T of the metal plating layer was 2.00, and the gap G was long with respect to the average thickness T of the metal plating layer. Therefore, it is considered that even after the completion of the plating treatment, the portions of the metal plating layer across the gap G in the layer to be plated were not electrically connected, and thus, the evaluation of the yield was B. In Example 5, the ratio of the length L of the gap G in the layer to be plated to the average thickness T of the metal plating layer was 2.50, and the gap G was even longer with respect to the average thickness T of the metal plating layer. Therefore, it is considered that even after the completion of the plating treatment, the portions of the metal plating layer across the gap G in the layer to be plated were not electrically connected in many cases, and thus, the evaluation of the yield was C.

Thus, from the results of the evaluation of the shading unevenness and the evaluation of the yield, it can be seen that by setting the length L of the gap G in the layer to be plated to 0.50 times to 2.00 times the average thickness T of the metal plating layer, it is possible to obtain a touch sensor excellent in prevention of the shading unevenness and improvement in the yield.

The evaluation results for Examples 8 and 9 are shown in Table 2.

TABLE 2

| | Shape of layer to be plated | Length L of gap G | Average thickness T of metal plating layer | Length L/average thickness T | Average line width W of fine metal wire M | Evaluation of shading unevenness | Evaluation of moire | Evaluation of yield |
|---|---|---|---|---|---|---|---|---|
| Example 8 | FIG. 5 | 0.80 μm | 0.80 μm | 1.00 | 2.00 μm | A | A | A |
| Example 9 | FIG. 5 | 0.80 μm | 0.80 μm | 1.00 | 2.20 μm | A | B | A |

In the evaluation of the moire, Examples 1 to 8 were evaluated as A, but Example 9 was evaluated as B. In Example 9, it is considered that since the average line width W of the fine metal wire M was 2.20 μm and was thicker than that of the other Examples, the moire was able to be observed. Therefore, from the results of the evaluation of the moire, it can be seen that by setting the average line width W of the fine metal wire M to 1.00 μm to 2.00 μm, it is possible to obtain a touch sensor excellent in prevention of a moire.

The evaluation results for Examples 10 to 12 are shown in Table 3.

TABLE 3

| | Shape of layer to be plated | Length L of gap G | Average thickness T of metal plating layer | Length L/average thickness T | Average line width W of fine metal wire M | Evaluation of shading unevenness | Evaluation of moire | Evaluation of yield |
|---|---|---|---|---|---|---|---|---|
| Example 10 | FIG. 16 | 0.80 μm | 0.80 μm | 1.00 | 1.50 μm | A | A | A |
| Example 11 | FIG. 17 | 0.80 μm | 0.80 μm | 1.00 | 1.50 μm | A | A | A |
| Example 12 | FIG. 17 | 2.00 μm | 0.80 μm | 2.50 | 1.50 μm | A | A | A |

In Examples 10 to 12, the results of the evaluation of the shading unevenness, the evaluation of the moire, and the evaluation of the yield were all A. In particular, in comparison between Example 5 and Example 12, it is considered that in a case where the metal plating layer 4 was formed on the layer 3 to be plated while a plurality of island-like parts K were arranged in Example 12, a path connecting the metal plating layers 4 to each other in a plurality of directions was formed and the portions of the layers 3 to be plated, spaced apart from each other, could be reliably filled with the metal plating layer 4, leading to the evaluation of the yield of A.

The present invention is basically configured as described above. Hereinabove, the touch sensor of the embodiment of the present invention has been described in detail. However, the present invention is not limited to the above-described embodiments, and various improvements or modifications can be made within a range not departing from the scope of the present invention.

EXPLANATION OF REFERENCES

1: substrate
1A: first surface
1B: second surface
2A: first conductive layer
2B: second conductive layer
3: layer to be plated
4: metal plating layer
11, 21: touch detection electrode
12, 22: first electrode pad
13, 23: peripheral wiring
14, 24: second electrode pad
31: touch detection electrode pattern part
32: first electrode pad pattern part
32A, 32C, 33A: lower pattern part
32B, 32D, 33B: upper pattern part
33: peripheral wiring pattern part
A1: arm part
A2: extension part
A3, B1: first arm part
A4, B2: first extension part
A5, B3: second arm part
A6, B4: second extension part
E1, E2: conductive pattern part
G: gap
K: island-like part
L: length
M: fine metal wire
R: discontinuous region
T1: thickness
W1: line width

What is claimed is:

1. A touch sensor comprising:
a substrate; and
conductive layers formed on the substrate,
wherein the conductive layer has
a touch detection electrode,
a first electrode pad formed on at least one end of the touch detection electrode,
a peripheral wiring drawn out from the first electrode pad, and
a second electrode pad connected to the peripheral wiring,
the touch detection electrode, the first electrode pad, the peripheral wiring, and the second electrode pad each have a layer to be plated and a metal plating layer covering the layer to be plated,
the layer to be plated in at least one of the first electrode pad or the peripheral wiring has a gap that interrupts the layer to be plated, and
portions of the metal plating layer across the gap are electrically connected to each other by filling the gap with the metal plating layer.

2. The touch sensor according to claim 1,
wherein the conductive layer has a plurality of conductive pattern parts, each including the touch detection electrode, the first electrode pad, the peripheral wiring, and the second electrode pad, and
the layer to be plated in at least one of the plurality of conductive pattern parts has the gap.

3. The touch sensor according to claim 1,
wherein the touch detection electrode includes a plurality of fine metal wires consisting of the layer to be plated and the metal plating layer, and
a line width of the plurality of fine metal wires is 1.00 μm to 2.00 μm.

4. The touch sensor according to claim 2,
wherein the touch detection electrode includes a plurality of fine metal wires consisting of the layer to be plated and the metal plating layer, and
a line width of the plurality of fine metal wires is 1.00 μm to 2.00 μm.

5. The touch sensor according to claim 1,
wherein the gap of the layer to be plated has a length of 0.50 times to 2.00 times an average thickness of the metal plating layer.

6. The touch sensor according to claim 2,
wherein the gap of the layer to be plated has a length of 0.50 times to 2.00 times an average thickness of the metal plating layer.

7. The touch sensor according to claim 3,
wherein the gap of the layer to be plated has a length of 0.50 times to 2.00 times an average thickness of the metal plating layer.

8. The touch sensor according to claim 2,
wherein the layer to be plated in the conductive pattern part has a plurality of the gaps.

9. The touch sensor according to claim 8,
wherein the layer to be plated includes a discontinuous region composed of a plurality of island-like parts which are spaced from each other, and
the plurality of the gaps are formed between a plurality of portions of the layer to be plated, which are adjacent to each other in a plurality of directions and spaced from each other in the discontinuous region.

10. A method for producing a touch sensor, the method comprising:
forming, on a substrate, a layer to be plated that has shapes corresponding to a touch detection electrode, a first electrode pad formed on at least one end of the touch detection electrode, a peripheral wiring drawn out from the first electrode pad, and a second electrode pad connected to the peripheral wiring, and has a gap in a portion corresponding to at least one of the first electrode pad or the peripheral wiring, and
forming a metal plating layer on the layer to be plated to fill the gap by a plating treatment.

11. The touch sensor according to claim 1,
wherein the touch detection electrode, the first electrode pad, the peripheral wiring, and the second electrode pad are electrically connected to each other in this order.

* * * * *